(12) United States Patent
Li

(10) Patent No.: US 7,974,088 B2
(45) Date of Patent: Jul. 5, 2011

(54) RETAINING APPARATUS FOR DATA STORAGE DEVICE

(75) Inventor: Zhan-Yang Li, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 87 days.

(21) Appl. No.: 12/534,224

(22) Filed: Aug. 3, 2009

(65) Prior Publication Data
US 2010/0307990 A1   Dec. 9, 2010

(30) Foreign Application Priority Data
Jun. 8, 2009   (CN) .......................... 2009 1 0303024

(51) Int. Cl.
*G06F 1/16* (2006.01)
(52) U.S. Cl. .............................. 361/679.37; 361/679.33
(58) Field of Classification Search ............. 361/679.33, 361/679.37, 679.34
See application file for complete search history.

(56) References Cited

U.S. PATENT DOCUMENTS

| | | | | |
|---|---|---|---|---|
| 5,654,873 A | * | 8/1997 | Smithson et al. | 361/679.37 |
| 6,166,901 A | * | 12/2000 | Gamble et al. | 361/679.34 |
| 6,233,143 B1 | * | 5/2001 | Gamble et al. | 361/679.34 |
| 6,325,353 B1 | * | 12/2001 | Jiang | 248/682 |
| 6,560,098 B1 | * | 5/2003 | Beinor et al. | 361/679.39 |
| 6,603,657 B2 | * | 8/2003 | Tanzer et al. | 361/679.33 |
| 6,661,651 B1 | * | 12/2003 | Tanzer et al. | 361/679.33 |
| 6,683,785 B1 | * | 1/2004 | Chen | 361/679.33 |
| 6,717,816 B1 | * | 4/2004 | Tanaka et al. | 361/728 |
| 6,876,547 B2 | * | 4/2005 | McAlister | 361/679.33 |
| 6,891,723 B1 | * | 5/2005 | Lin et al. | 361/679.33 |
| 6,927,973 B2 | * | 8/2005 | Song et al. | 361/679.33 |
| 7,072,177 B2 | * | 7/2006 | Peng et al. | 361/679.33 |
| 7,251,132 B1 | * | 7/2007 | Paul et al. | 361/679.33 |
| 7,321,489 B2 | * | 1/2008 | McAlister | 361/679.33 |
| 7,477,511 B2 | * | 1/2009 | Hsu et al. | 361/679.37 |
| 7,551,427 B1 | * | 6/2009 | Blaugrund et al. | 361/679.38 |
| 2007/0211422 A1 | * | 9/2007 | Liu et al. | 361/685 |
| 2008/0204994 A1 | * | 8/2008 | Wang | 361/685 |
| 2008/0288971 A1 | * | 11/2008 | Lai | 720/679 |

* cited by examiner

*Primary Examiner* — Lisa Lea-Edmonds
(74) *Attorney, Agent, or Firm* — D. Austin Bonderer

(57) ABSTRACT

A retaining apparatus for at least one data storage device includes a tray and a retaining device. The tray is used for receiving the at least one data storage device. The retaining device is attached to a front side of the tray. The retaining device includes base member, an arm member, an operation member and a blocking tab. The base member is attached to the front side of the tray. The arm member is pivotably attached to the base member about a first pivot axis. The operation member is pivotably attached to the base member about a second pivot axis. The second pivot axis is substantially perpendicular to the first pivot axis. The blocking tab is secured to the operation member. The blocking tab has a blocking portion to block the arm member.

19 Claims, 8 Drawing Sheets

RETAINING APPARATUS FOR DATA STORAGE DEVICE

BACKGROUND

1. Technical Field

The disclosure generally relates to a retaining apparatus for data storage devices, especially to a retaining apparatus with a tray for receiving and retaining at least one data storage device.

2. Description of Related Art

Usually, a data storage device, such as a hard disk drive is simply screwed to a computer enclosure. This conventional mounting means can be complex, difficult and substantially wastes time. In addition, in use, vibration of the data storage device may cause the screws to come loose and may result in damage to the data storage device. Understandably, some attempts have been taken to introduce a mounting apparatus for a data storage device without screws.

DETAILED DESCRIPTION

Figure 7:
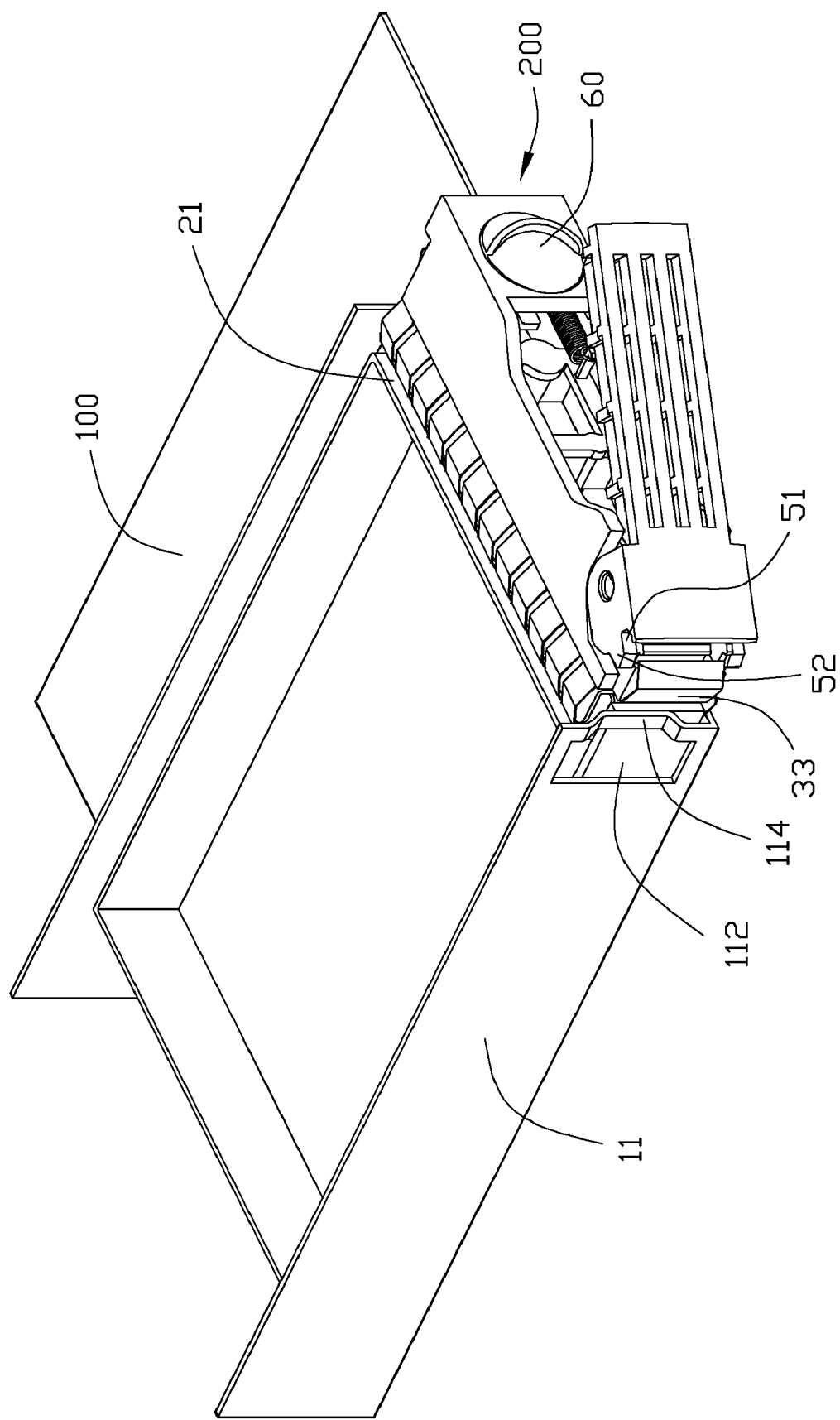
FIG. 7 is a pre-assembled view of the retaining apparatus and a bracket.

Referring to FIG. 7, a bracket 100 is used in a computer or an electronic device for mounting at least one retaining apparatus 200 for data storage device. The bracket 100 includes two parallel side plates 11. A slideway is defined between the two side plates 11 for receiving the retaining apparatus 200. Each side plate 11 defines an opening 112 and has a vertical baffle 114. The baffle 114 is slightly recessed into the slideway.

Figure 1:
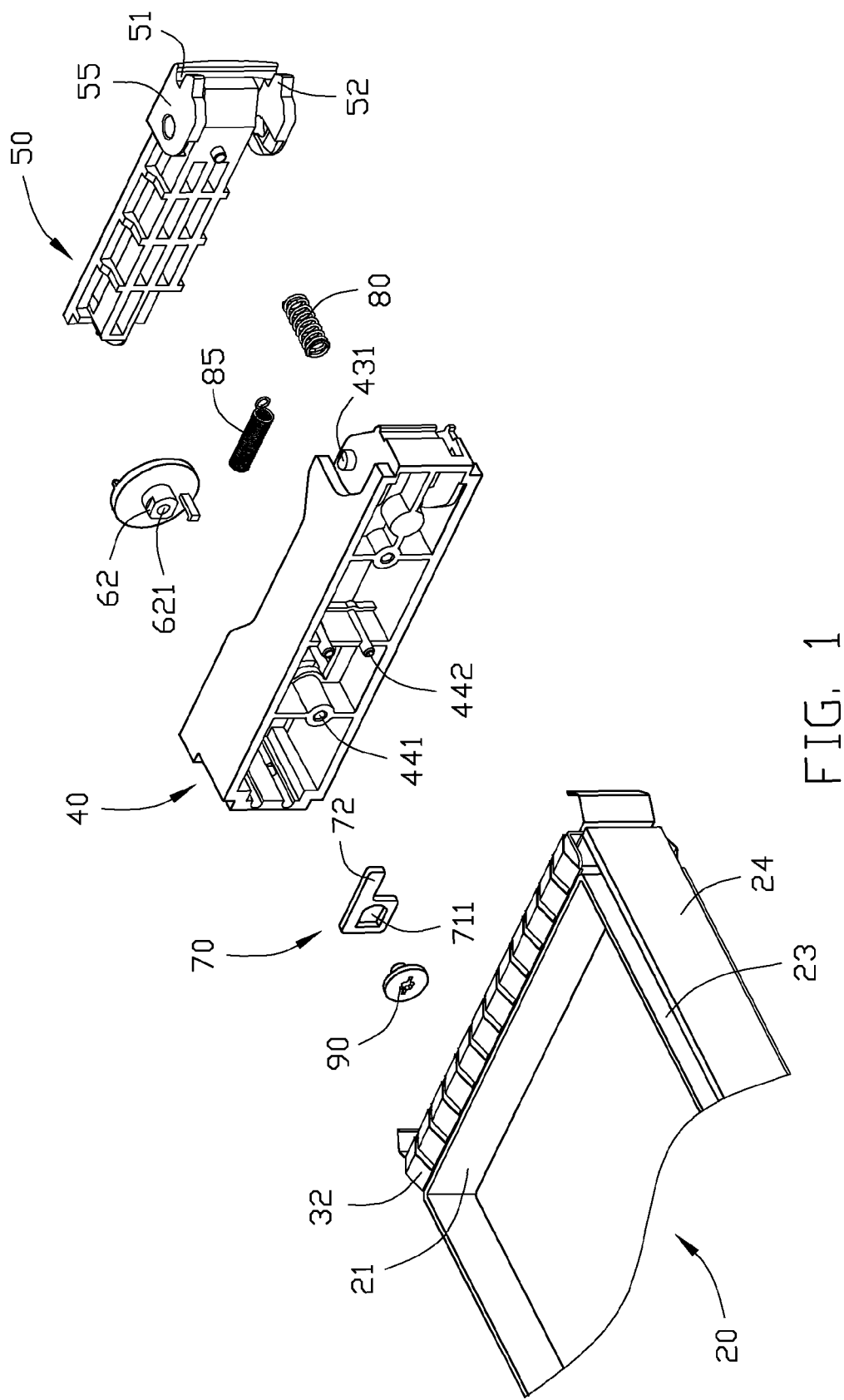
FIG. 1 is an exploded, isometric view of a retaining apparatus.
Figure 2:
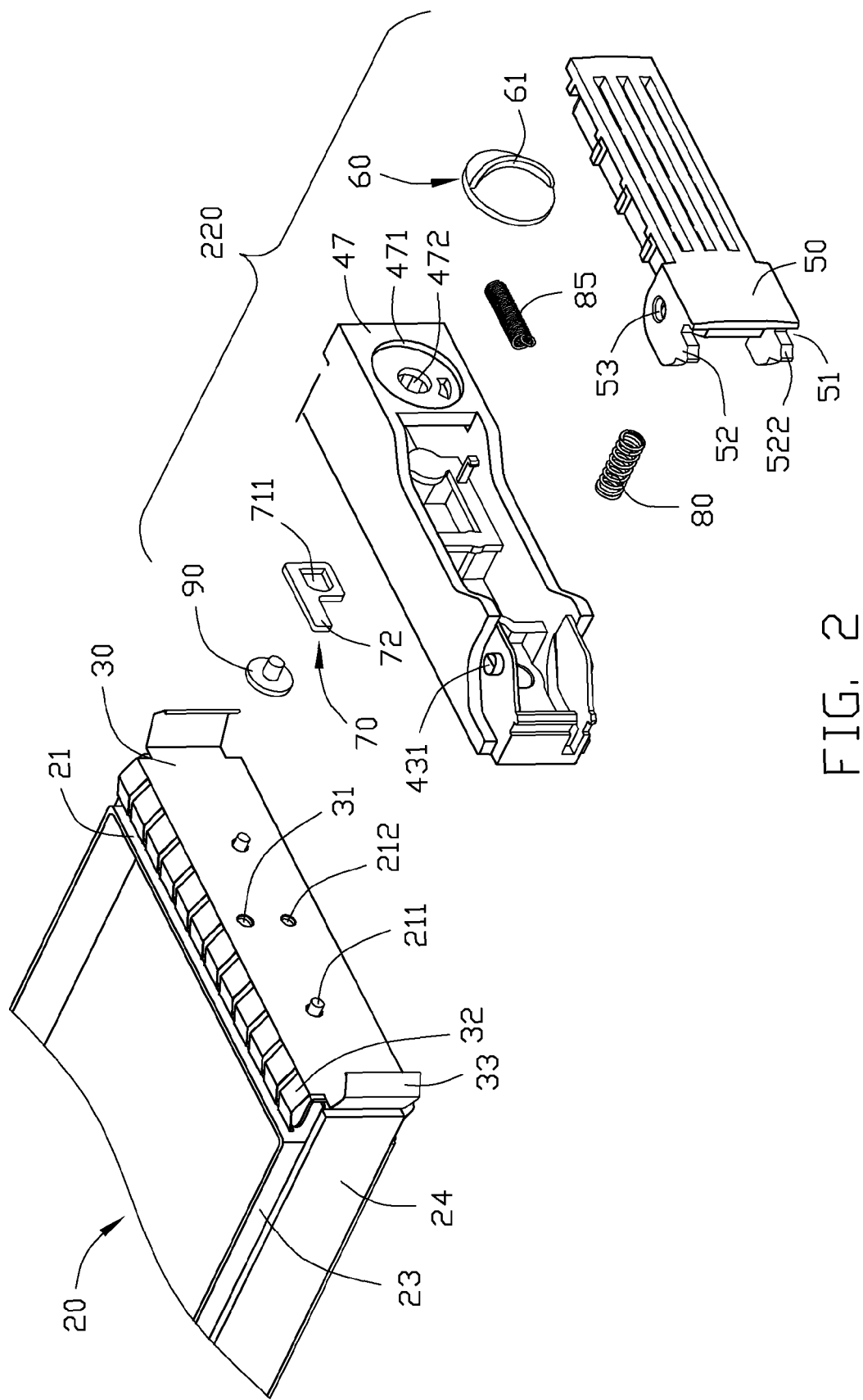
FIG. 2 is similar to FIG. 1, but showing in another aspect.
Figure 3:
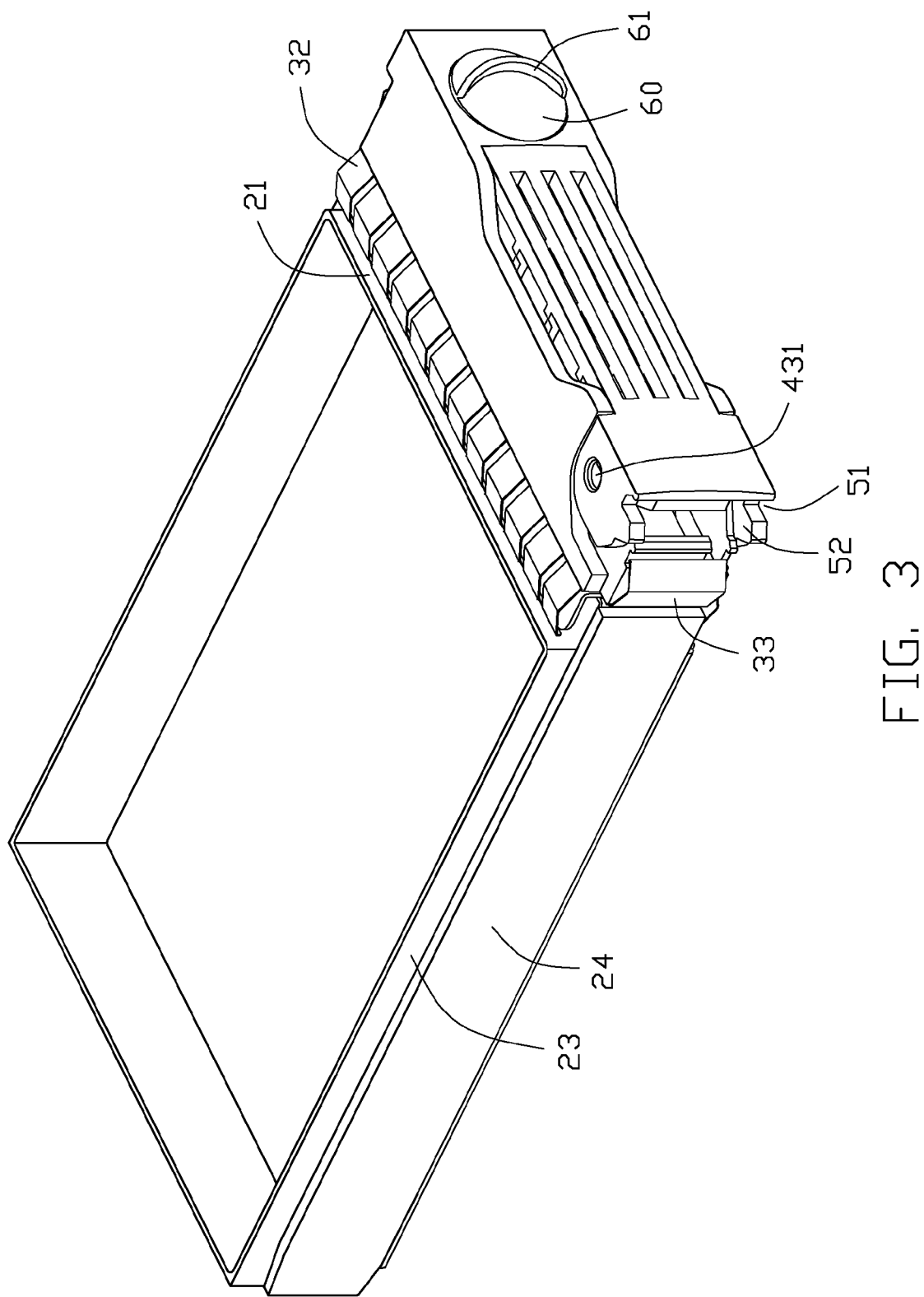
FIG. 3 is an assembled view of FIG. 1 showing an arm member being blocked by the blocking tab.

Referring to FIG. 1 and FIG. 2, each retaining apparatus 200 includes a tray 20 and a retaining device 220. The tray 20 has a front wall 21 and two parallel side walls 23. At least one screw post 211 protrudes from front wall 21. At least one position hole 212 is defined in the front wall 21 of the tray 20. An elastic cushion 24 is attached to each side wall 23 for absorbing lateral shock to the tray 20.

A shielding clip 30 is attached to the front wall 21 of the tray 20. The shielding clip 30 is made from flake metal for providing electromagnetic interference (EMI) shielding. The shielding clip 30 has a plurality of V-shaped resilient touch fingers 32 on top and bottom sides thereof and a pair of L-shaped resilient touch fingers 33 on lateral sides thereof. At least one through hole 31 is defined corresponding to the at least one position hole 212.

The retaining device 220 includes a base member 40, an arm member 51 and an operation member 60 and a blocking tab 70. The base member 40 has a pair of pivot pins 431 at one end thereof and a front panel 47 at an opposite end thereof. A circle recess 471 is defined in the front panel 47. A pivot opening 472 is defined in the front panel 47 at a central of the recess 471. A first pivot axis is defined by the two pivot pins 431. At least one screw hole 441 is defined corresponding to the at least one screw post 211. At least one positioning post 442 protrudes from the base member 40 corresponding to the at least one position hole 212.

The arm member 50 defines a pair of pivot holes 53 at a first end thereof corresponding to the pivot pins 431 and has a retaining portion 55 formed at a distal portion of the first end. The retaining portion 55 defines a cutout 51 to engage with the baffle 114 and has a wedge-shaped ridge 52. The ridge 52 has an angled engaging surface 522. A coil spring 80 is located between the base member 40 and the arm member 50, and provides ejection force to the arm member 50 to rotate the arm member 50 away from the base member 40. An engaging slot 56 is defined at a second end of the arm member 50. The second end opposites to the first end (as shown in FIG. 4).

The operation member 60 is pivotably attached to the front panel 47 of the base member 40 in the recess 471. The operation member 60 is disk shaped, and the operation member 60 pivots about a second pivot axis which is perpendicular to the first pivot axis. The operation member 60 has a handle 61 at a front side thereof. The operation member 60 has a pivot post 62 extending from the operation member 60 corresponding to the pivot opening 472. A securing hole 621 is defined in the pivot post 62. The pivot post 62 has a non-circular section.

The blocking tab 70 can be made from a flake metal. The blocking tab 70 defines a securing opening 711 corresponding to the pivot post. Due to the non-circular section of the pivot post 62, the pivot post 62 is capable of engaging with the blocking tab 70 at the securing opening 711, so that the blocking tab 70 can be driven to rotate with operation member 60 together. The blocking tab 70 and the operation member 60 are placed on opposite sides of the front panel 47. The blocking tab 70 has a blocking portion 72 to engage with the engaging slot 56. A fastener 90 is used for fixing the blocking tab 70 to the pivot post 62. A spring 85 is provided to hook the operation member 60 to the base member 40 to bias the operation member 60 to an original state.

Figure 4:
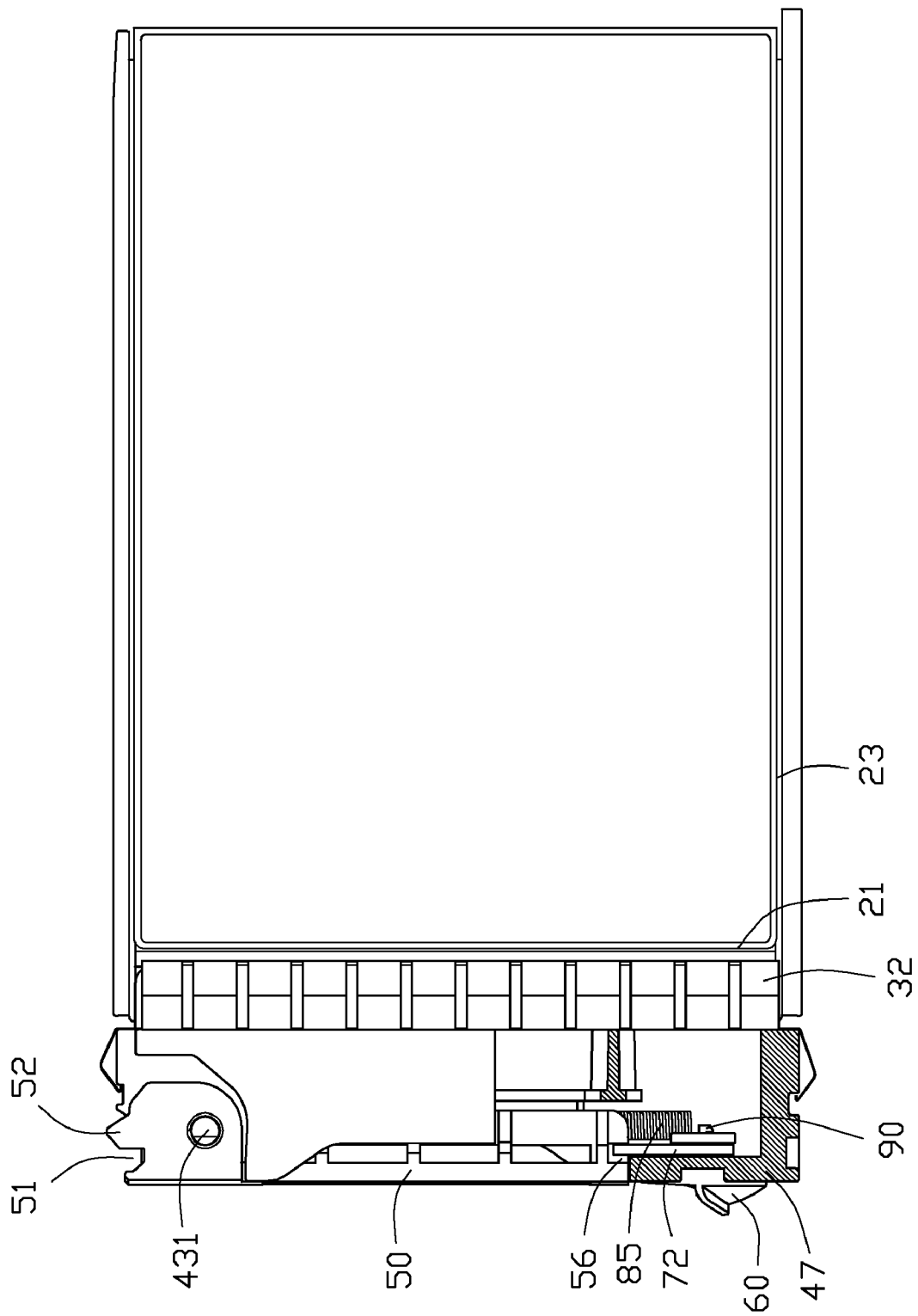
FIG. 4 is a section view of the FIG. 3.
Figure 5:
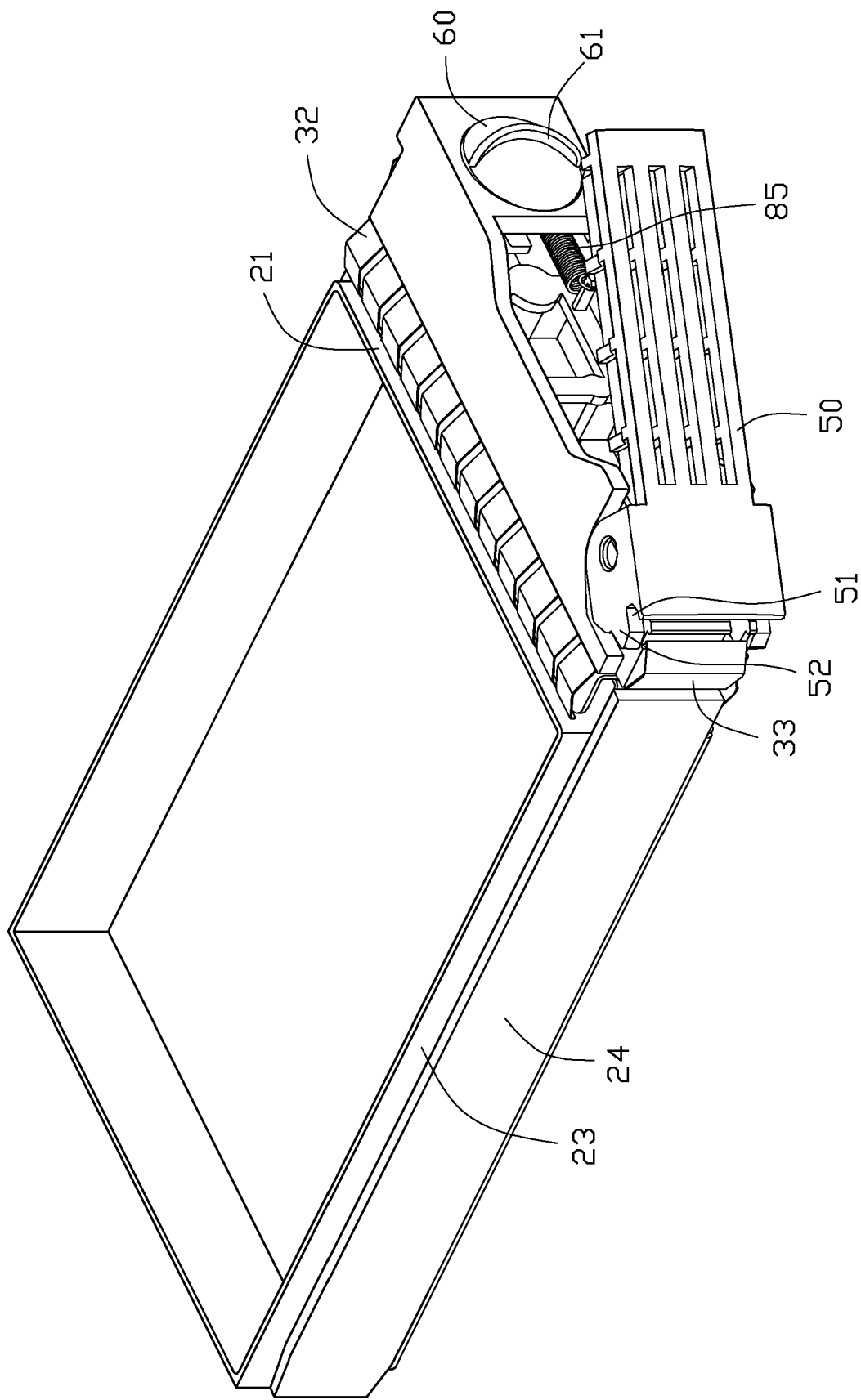
FIG. 5 is similar to FIG. 3, but showing the arm member being rotated away from the blocking tab.
Figure 6:
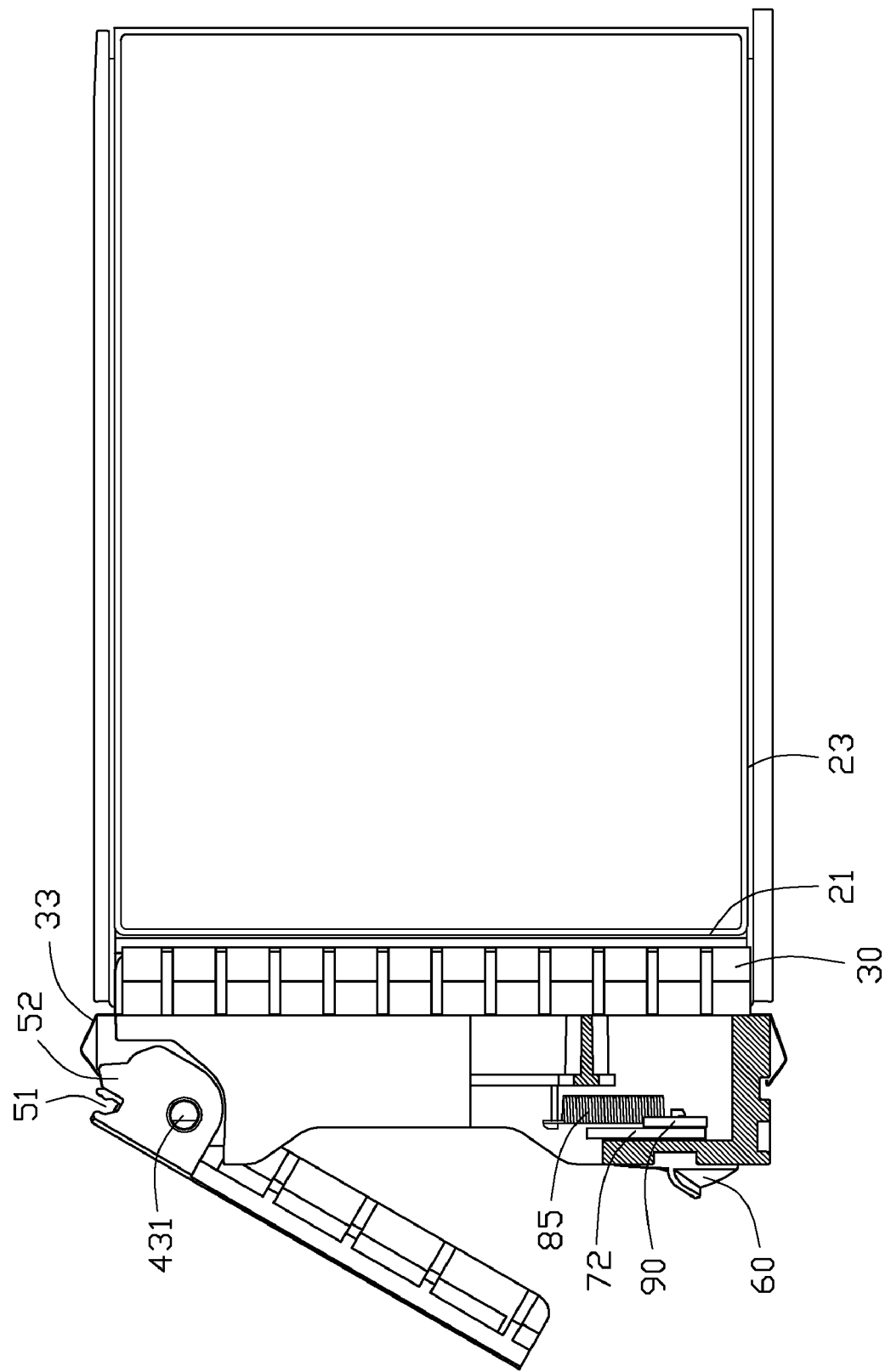
FIG. 6 is a section view of the FIG. 5.

Referring through FIG. 4 to FIG. 6, when assembling the retaining apparatus 200, the base member 40 is first mounted to the front wall 21 of the tray 20 with the shielding clip 30 located between the tray 20 and the base member 40. The arm member 50 is pivotably fixed to the base member 40 about the first pivot axis and the spring 80 is deformably located between the base member 40 and the arm member 50. The operation member 60 is rotatably attached to the front panel 47 of the base member 40 with the pivot post 62 extending through the pivot opening 472. The blocking tab 70 is engaged with the pivot post 62 with the fastener 90 screwing into the pivot post 62. The spring 100 is hooked onto the operation member 60 and the base member 40. The blocking portion 72 extends toward arm member 50.

Figure 8:
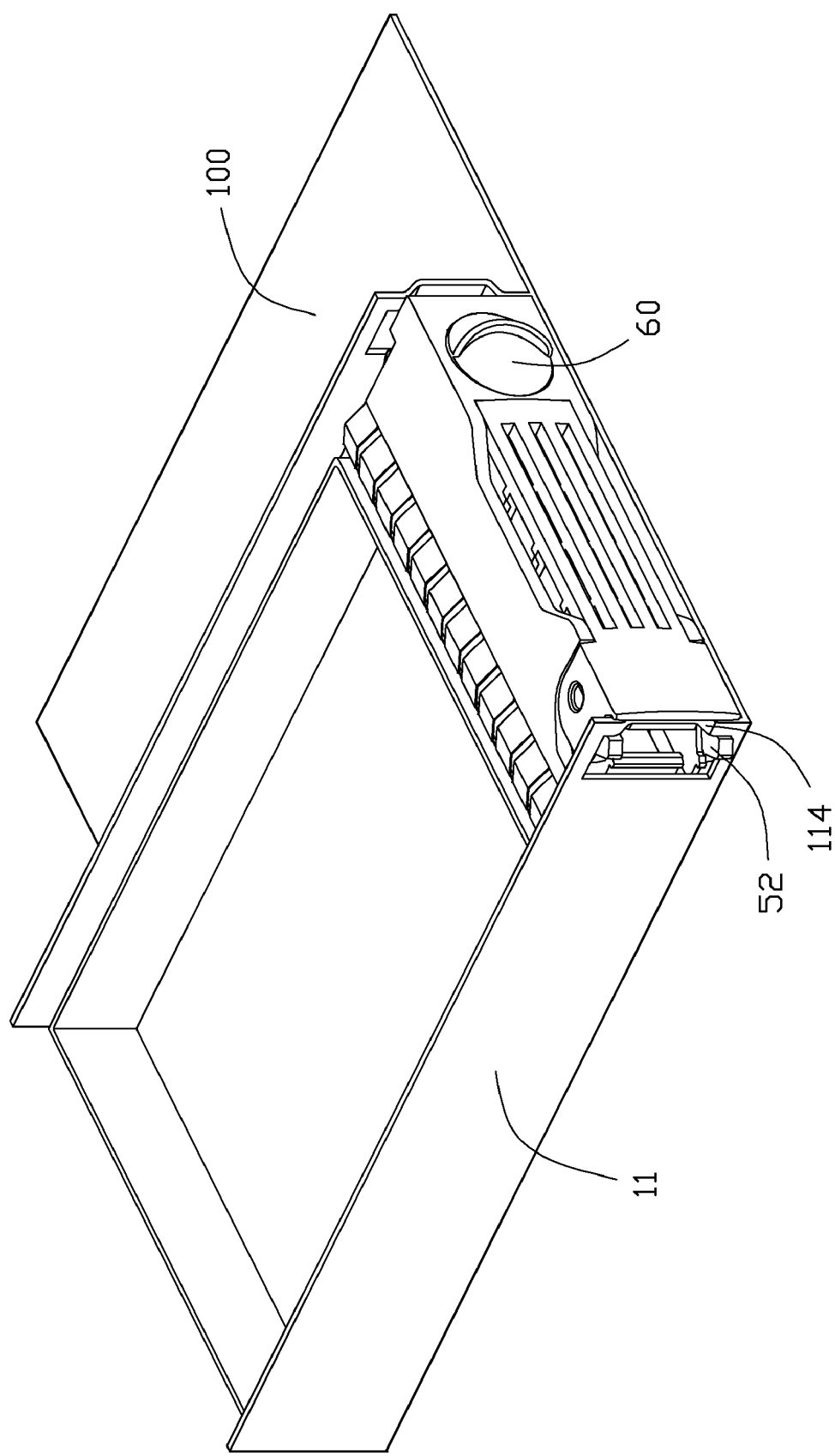
FIG. 8 is similar to FIG. 7, but shown the retaining apparatus is mounted in the bracket.

Referring to FIG. 7 and FIG. 8, when mounting the retaining apparatus 200 into the bracket 100, the arm member 50 is angled from the base member 40 and the engaging surface 522 is positioned parallel to the side plate 11 of the bracket 100. The tray 20 and the retaining device 220 are completely slid into the slideway of the bracket 100. Each resilient touch finger 33 is located between each side plate 11 and a lateral side of the base member 40. Then the arm member 50 is pressed to rotate to the base member 40, the baffle 114 is engaged into the cutout 51 gradually. The operation member 60 is driven to rotate and the blocking portion 72, mounted on the operation member 60, is rotated. When the second end of the arm member 50 reaches the base member 40, the operation member 60 is released, so that the blocking portion 72 moves back to the original position to engage with the engaging slot 56. The arm member 50 is blocked and the baffle 114 is engaged into the cutout 51 completely. The spring 80 is pressed. The retaining apparatus 200 is then mounted to the bracket 100.

When removing the retaining apparatus 200 from the bracket 100, the operation member 60 is rotated to rotate the blocking tab 70 until the blocking portion 72 is disengaged from the engaging slot 56. The arm member 50 rotates outwardly due to the resilient force of the spring 80. The retaining portion 55 is disengaged from the baffle 114. The retaining apparatus 200 then is capable of being moved out of the bracket 100.

It is to be understood, however, that even though numerous characteristics and advantages have been set forth in the foregoing description of preferred embodiments, together with details of the structures and functions of the preferred embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A retaining apparatus for at least one data storage device, comprising:
a tray for receiving the at least one data storage device; and
a retaining device comprising:
a base member attached to the tray;
an arm member pivotably attached to the base member about a first pivot axis, the arm member having a retaining portion;
an operation member pivotably attached to the base member about a second pivot axis, the second pivot axis substantially perpendicular to the first pivot axis; and
a blocking tab secured to the operation member, the blocking tab having a blocking portion to block the arm member;
wherein when the arm member is rotatable between a retaining position where the arm member is blocked by the blocking portion, and the tray and the retaining device are secured to a bracket and a releasing position where the arm member is angled to the base member, and the retaining portion is disengaged from the bracket;
a spring is located between the base member and the arm member to bias the arm member away from the base member.

2. The retaining apparatus of the claim 1, wherein the tray comprises two side walls and an elastic cushion attached to each side wall.

3. The retaining apparatus of the claim 1, wherein a shielding clip is located between the tray and the base member.

4. The retaining apparatus of the claim 3, wherein the shielding clip comprising a resilient touch finger and the touch finger extends to a lateral side of the base member.

5. The retaining apparatus of the claim 1, wherein the base member has a front panel, the front panel defines a pivot opening; the operation member has a pivot post extending through the pivot opening; the blocking tab defines a securing opening corresponding to the pivot post.

6. The retaining apparatus of the claim 5, wherein the pivot post has a non-circular cross-section, so that the pivot post is capable of driving the blocking tab to rotate.

7. The retaining apparatus of the claim 1, wherein an engaging slot is defined by the arm member.

8. The retaining apparatus of the claim 1, wherein a positioning post protrudes from the base member; and a positioning hole is defined in the tray receiving the positioning post.

9. A computer comprising:
a bracket comprising a side plate, the side plate has a baffle at a front end thereof; and
a retaining apparatus comprising:
a tray for receiving the data storage device; and
a retaining device comprising:
a base member attached to the tray;
an arm member pivotably attached to the base member about a pivot axis, the arm member having a retaining portion for engaging the baffle;
an operation member pivotably attached to the base member about a second pivot axis, the second pivot axis substantially perpendicular to the first pivot axis; and
a blocking tab secured to the operation member, the blocking tab having a blocking portion to block the arm member;
wherein when the arm member is rotatable between a retaining position and a released position; in the retaining position, the arm member is blocked by the blocking portion, and the retaining apparatus is retained in the bracket with the retaining portion engaging with the baffle; in the released position, the arm member is rotated away from the base member, the retaining portion is released by the blocking portion from the bracket, and the retaining apparatus is disengaged from the bracket.

10. The computer of the claim 9, wherein the tray comprises two side walls and an elastic cushion attached to each side wall.

11. The computer of the claim 9, wherein a shielding clip is located between the tray and the base member.

12. The computer of the claim 11, wherein the shielding clip comprising a resilient touch finger and the touch finger is located between a lateral side of the base member and the side plate.

13. The computer of the claim 9, wherein the base member has a front panel, the front panel defines a pivot opening; the operation member has a pivot post extending through the pivot opening; the blocking tab defines a securing opening corresponding to the pivot post.

14. The computer of the claim 13, wherein the pivot post has a non-circular cross-section and is capable of driving the blocking tab to rotate.

15. The computer of the claim 9, wherein an engaging slot engages the blocking portion.

16. The computer of the claim 9, wherein a spring is located between the base member and the arm member to bias the arm member away from the base member.

17. The computer of the claim 9, wherein a positioning post protrudes from the base member; and a positioning hole is defined in the tray that receives the positioning post.

18. The computer of the claim 9, wherein the baffle is vertically formed on the side plate; the retaining portion has a cutout corresponding to the baffle.

19. The computer of the claim 9, wherein the retaining portion has a wedge-shaped ridge.

* * * * *